Dec. 14, 1971   W. O. SCHWAKE   3,626,607
SPEECH TRAINING AID
Filed Feb. 24, 1970

WILLIAM O. SCHWAKE
INVENTOR

BY

Robert K. Rhea
AGENT

3,626,607
SPEECH TRAINING AID
William O. Schwake, 1133 W. 1st, Sulphur, Okla. 73086
Filed Feb. 24, 1970, Ser. No. 13,398
Int. Cl. G09b *21/00*
U.S. Cl. 35—35 A            3 Claims

ABSTRACT OF THE DISCLOSURE

A speech training aid for simultaneously imparting tactile and visual indication of speech and speech patterns including electronic amplification of an instructor's vocal utterances which is transmitted to provide tactile perception to a recipient by a transducer mechanically applying amplified vibrations to a panel in contact with the hands or feet of the recipient. The tactile sound vibration sensation is supplemented visually by a lamp energized in response to the electrical energy and frequency of an instructor's voice.

BACKGROUND OF THE INVENTION

(1) Field of the invention

The present invention relates to speech training of the deaf or hard of hearing and more particularly to simultaneous tactile and visual indication of speech and speech patterns.

In schools specializing in the education of the very hard of hearing persons, various types of speech stimuli are employed for teaching speech and speech lip reading to impart to the hard of hearing an indication of the intensity of response desired. There is considerable difference between listening to other persons speak and listening to or observing the result of the speech of one's self. The deaf or hard of hearing frequently, in attempts to vocalize words, speak in a monotone rather than modulating the words or phrases. Speech sounds, normally heard by a person, which emanates from the vocal utterances of a speech therapist contain only the air conducted factor or disturbances of the sound. This invention improves on the air conducted communication by simultaneously imparting a tactile sensation to the pupil and visually supplements the tactile sensation by a vibration intensity lamp while permitting the pupil to observe the lip movements of the teacher.

(2) Description of the prior art

Speech training by tactile perception of sound is disclosed by Pat. Nos. 1,738,289 and 2,972,140. Pat. Nos. 2,273,078 and 3,453,749 disclose a means for imparting amplified vibrations to the larynx region of a pupil and Pat. No. 3,069,789 discloses a manner of speech training of one or more persons by earphones connected with tape units, or the like, on which a simple speech pattern is recorded permitting recording and play back of the pupil's voice to improve his speech.

This invention is an improvement over these patents in that it provides four indications of speech and speech response, namely, tactile sensation of amplified speech, observing variations in intensity of a signal lamp during speech and observing the instructor's lip movement and hearing any sound the residual hearing of the pupil, if he has any, permits him to hear. In turn the pupil may speak into the microphone and attempt to duplicate the sounds made by the instructor, the tactile sensations and variations in signal lamp filament intensity.

SUMMARY OF THE INVENTION

This teaching device comprises a platform formed by a horizontal base having a plurality of upstanding resilient legs or supports supporting a vibrating panel. A microphone is connected with the input of an audio frequency amplifier which has its output connected with a transducer secured to the depending surface of a vibratile panel so that the various frequencies of the speech of an instructor speaking into the microphone are amplified and transmitted in the form of mechanical vibrations to the panel on which the pupil places his feet or hands for tactile transmission of the amplified vibrations to the pupil. The vibrations intensity lamp is connected with the amplifier output and mounted on the microphone for a visual indication, to the pupil of the variations of sound frequencies and intensity.

The principal object of this invention is to provide a device for imparting tactile and visual indication of speech and speech modulations to a pupil.

DESCRIPTION OF THE PREFERRED EMBODIMENT

Figure 1:
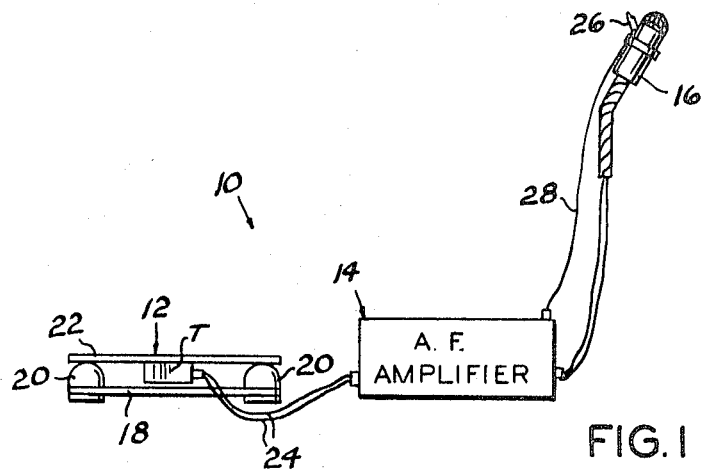
FIG. 1 is an elevational view of the device.
Figure 2:
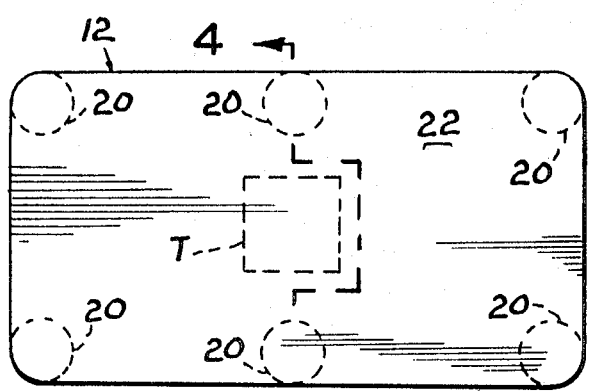
FIG. 2 is a top view of the platform.
Figure 3:
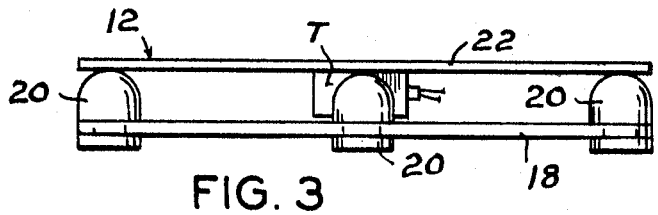
FIG. 3 is a side elevational view of FIG. 2; and,
FIG. 4 is a vertical cross-sectional view taken substantially along the line 4—4 of FIG. 2.
Figure 4:
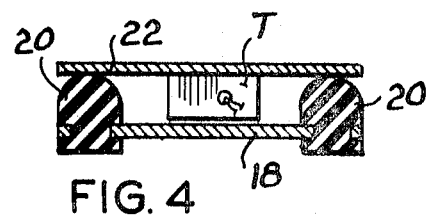

Like characters of reference designate like parts in those figures of the drawings in which they occur.

In the drawings:

The reference numeral 10 indicates the device, as a whole, comprising a platform 12, audio frequency amplifier 14 and microphone 16. The amplifier and microphone 16 are conventional being connected with a source of electrical energy, not shown.

The platform 12 comprises a horizontal base plate 18 having a plurality of, six in the example shown, leg-like supports 20 formed of resilient material, such as rubber, extending through suitable apertures formed in the base plate 18 in spaced-apart relation. The legs 20 project below the depending surface of the plate 18 for contacting a supporting surface, such as a floor. The upwardly directed end portion of each of the legs is substantially hemispherical in configuration and are disposed at a selected distance above the plate 18. A vibratile panel 22, substantially equal in overall dimensions with the plate 18, horizontally overlies the upwardly directed end surfaces of the legs 20 and is supported thereby. The panel 22 is formed of relatively thin rigid material and is connected to the legs 20, as by a suitable bonding material, not shown, which permits the panel 22 to be vibrated.

A transducer T is secured to the central portion of the depending surface of the panel 22 and is connected by wires 24 with the output of the amplifier 14 for the purposes presently described.

A relatively small lamp 26, generally referred to as a "neon bulb," is mounted on or attached to the microphone 16 and connected with the output of the amplifier by a wire or wires 28 in a conventional manner.

OPERATION

In operation a pupil places his feet or hands on the panel 22 while the instructor speaks into the microphone 16. Vocal utterances of the instructor are picked up by the microphone which generates electrical energy of similar frequency characteristics. The electrical energy is amplified by the amplifier 14 and the amplified frequencies of the vocal pattern are transmitted to the transducer T which directly imparts mechanical vibratory motion to the panel 22 so that the vibratory motion generates a resonance in the panel corresponding to the amplified frequencies. Thus, the pupil can sense the variations in intensity of the vibrating panel by tactile contact with the platform 22 while simultaneously the vibration intensity bulb 26 varies in its luminosity by the potential applied to its filament in accordance with the different frequencies of amplified sound from the output of the amplifier.

The pupil can observe lip movement of the instructor for comparison with the variations in intensity of the bulb 26 and the vibrations of the panel 22. The pupil may, in turn, speak into the microphone in attempts to duplicate the spoken words and duplicating the vibration intensity of the platform panel 22 and variations in intensity of the filament of the bulb 26. In actual usage it has been found that teaching the hard of hearing in this manner greatly increases a responsive effort in duplicating speech sounds in both the deaf and the hard of hearing.

Obviously the invention is susceptible to changes or alterations without defeating its practicability, therefore, I do not wish to be confined to the preferred embodiment shown in the drawings and described herein.

I claim:

1. In combination with an amplifier having
   a microphone connected with its input and having an output for improving the communication between an instructor and a student by translating the instructor's vocal utterances to vibratory signals for tactile reception, the improvement comprising:
   a platform for placement of the feet or hands of a student including a horizontally disposed rigid panel;
   a base underlying said panel;
   resilient legs secured to said base and supporting said panel in vertical spaced relation above said base; and,
   a transducer connected with the output of said amplifier and secured to the depending surface of said panel to mechanically vibrate said panel with a frequency corresponding to the audio frequency of said amplifier generated by the instructor's speech pattern.

2. The combination of claim 1 and further including:
   an indicator lamp connected with the output of said amplifier and supported by said microphone for visually indicating the intensity of the audio frequencies amplified by said amplifier.

3. The combination according to claim 1 in which said legs
   project below and above the plane of said base and in which the upper end portion of each said leg is characterized by a hemisperical surface normally forming a point contact with the depending surface of said panel.

References Cited

UNITED STATES PATENTS

| | | | |
|---|---|---|---|
| 3,453,749 | 7/1969 | Snedeker, Jr. | 35—35 C |
| 1,738,289 | 12/1929 | Fletcher | 35—35 A UX |

WILLIAM H. GRIEB, Primary Examiner